United States Patent [19]

Tussing

[11] Patent Number: 4,480,470
[45] Date of Patent: Nov. 6, 1984

[54] GAS CAP

[76] Inventor: Dennis M. Tussing, Tempe, Ariz. 85281

[21] Appl. No.: 383,716

[22] Filed: Jun. 1, 1982

[51] Int. Cl.³ .............................................. G01F 19/00
[52] U.S. Cl. ................................. 73/427; 33/126.7 R; 116/227; 116/309; 222/158
[58] Field of Search ................. 73/315, 426, 427, 428, 73/429, 306; 116/227, 307, 309, 316; 222/158, 159; 33/126.7 R

[56] References Cited

U.S. PATENT DOCUMENTS

| 261,131 | 7/1882 | Bonshire | 116/309 |
| 1,475,183 | 11/1923 | Harwood | 33/126.7 R |
| 1,658,774 | 2/1928 | Taub | 33/126.7 R |
| 2,668,185 | 2/1954 | Castlen | 222/159 X |
| 2,685,860 | 8/1954 | Plakas | 116/316 |
| 2,712,396 | 7/1955 | Mowat | 73/426 X |
| 3,025,827 | 3/1962 | Shaar | 116/309 |
| 3,187,714 | 6/1965 | Flanigan | 116/309 |
| 4,135,404 | 1/1979 | Butler, Jr. | 73/426 |
| 4,292,846 | 10/1981 | Barnett | 73/427 |

FOREIGN PATENT DOCUMENTS 865810 12/1952 Fed. Rep. of Germany ........ 73/427

Primary Examiner—Gerald Goldberg
Assistant Examiner—Joseph W. Roskos
Attorney, Agent, or Firm—Weiss & Holloway

[57] ABSTRACT

A gas cap which incorporates an exposed indicator to disclose whether the tank contains fuel for a two-stroke or a four-stroke engine, and which further employs a tank-stored, graduated cylinder to permit precise preparation of a sufficient quantity of an uncontaminated fuel mixture to fill the tank for a two-stroke or a four-stroke engine.

7 Claims, 4 Drawing Figures

GAS CAP

BACKGROUND OF THE INVENTION

1. Field of the Invention

This invention relates to fuel handling, and, more particularly, relates to an improved type of cap for use on a gas can. Specifically, the invention relates to a self-venting gas cap which indicates whether the tank contains fuel for a two- or four-stroke engine, and which also provides an always-available, specially calibrated, measuring vessel for properly preparing a given oil and fuel mixture.

2. Description of the Prior Art

In the past, internal combustion engines have been widely used for diverse purposes. A typical application was the development of the outboard motor to propel boat. A fuel tank was a necessary companion to such an engine. The fuel tank for an outboard motor was typically a portable metal container, painted red for safety purposes. Other engine-driven equipment used similar fuel tanks.

Four-stroke engines used straight gasoline as fuel. Two-stroke engines used a gasoline and oil mixture as fuel. While oil-injection systems were developed for two-stroke engines, many two-stroke engines required that the oil be manually added to the gasoline. In a two-stroke engine, the fuel/air mixture circulates through the crankcase, and the oil component in the fuel mixture provides the necessary lubrication for the engine.

Since virtually all "gas cans" were painted red, it was difficult to tell whether a particular tank contained fuel for a two-stroke or a four-stroke engine. Since the added oil was essential to the proper operation of a two-stroke engine, it was critical to keep track of which of a group of fuel containers actually contained the oil. While one could remove the cap of the tank and manually investigate to determine which type of fuel the tank contained, the determination was difficult and the entire approach was inconvenient. In addition, the unnecessary removal of the gas cap was possibly dangerous.

The consequences of a fuel mix-up could be severe; if a two-stroke engine, which requires a gasoline-oil mixture for fuel, was instead operated on straight gasoline, bearing failure often followed.

A need continued to exist for an apparatus or method to provide a safe, apparent indication of the type of fuel in the tank.

In the case an outboard motor propelled by a two-stroke engine, it was typically necessary to manually measure the appropriate quantity of oil to be added. Since proper operation demanded that the quantity of oil added be quite precise, it was normally necessary to have a measuring device at hand when preparing a two-stroke fuel mixture. Unfortunately, it was often difficult to keep track of a separate measuring cup or device. Lack of an accurate measuring receptacle often resulted in use of a makeshift receptacle or an "eyeball" measurement. In any case, the cup or device was typically dirty when located. Thus, it was normally necessary to first clean the measuring device in order to avoid contaminating the mixture under preparation.

A need existed for a convenient, always-available, self-cleaning measuring receptacle for use in the preparation of a fuel mixture for a two-stroke engine.

SUMMARY OF THE INVENTION

In accord with a broadest aspect of the invention, it is an object to provide an improved gas cap.

It is another object to provide a gas cap which can indicate to an observer whether the tank contains two-stroke or four-stroke fuel.

It is a further object to provide a gas cap for a two-stroke fuel tank, which cap provides a self-cleaning measuring receptacle for gauging the quantity of oil to be added to a specific volume of gasoline.

It is an object to provide an apparatus for monitoring the fuel level in a conventional gas tank.

It is an object to teach a method for monitoring the type of fuel contained in a conventional portable fuel tank.

It is yet another object to teach an improved method for measuring oil to be added to a two-stroke fuel mixture.

It is a still further object to teach a method for storing a measuring receptacle for use in measuring oil into a fuel mixture.

DESCRIPTION OF THE PREFERRED EMBODIMENTS

In accord with one embodiment of the invention, an improved sealing-cap for a fuel tank is disclosed, comprising: closure means having a removable closure for engaging the tank; measuring means having a graduate coupled to the tank-side of said closure for providing an oil-measuring receptacle; dipstick means in communication with the graduate for providing a measure of the quantity of gas required to fill the tank to a desired fuel mixture level; conversion means adjoining the dipstick means for providing a measure of the quantity of oil required to fill the tank to a desired fuel mixture level; indicator means coupled to the cap for indicating whether the tank contains an oil mixture; and vent means coupled to the cap for permitting the interior of the tank to be selectively vented.

In accord with another embodiment of this invention, a method for monitoring whether a tank contains a gas-and-oil mixture or gas only is disclosed, comprising the steps of: displaying on the cap indicia corresponding to gas-and-oil and further to gas only; and orienting a rotatable indicator by turning handles attached to the indicator until the indicator identifies one of the indicia so that an observer can determine whether the fuel in the tank contains oil.

The foregoing and other objects, features and advantages of this invention will be apparent from the following, more particular description of the preferred embodiments of the invention, as illustrated in the accompanying drawings.

THE SPECIFICATION

Figure 1:
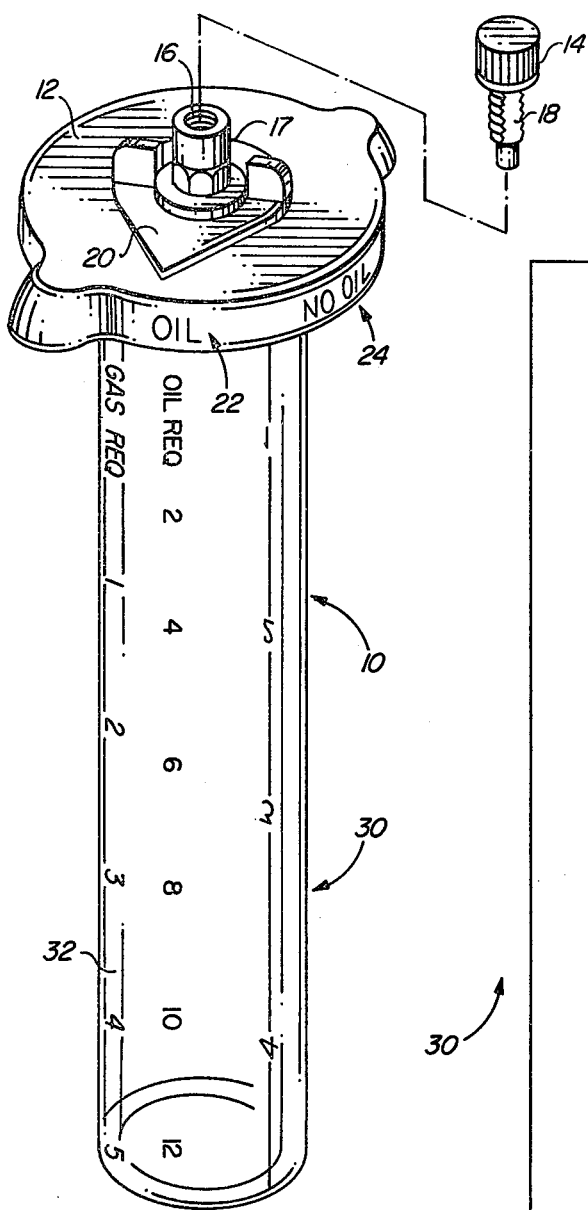
FIG. 1 is a perspective elevational view of the improved gas cap.

FIG. 1 is a perspective elevational view of an improved gas cap, as shown generally by reference number 10. A closure 12 forms the upper end of the cap 10. A gasketed vent screw 14 is mounted in an opening 16 in a vent sleeve 17. The opening 16 continues through the closure 12, as more fully shown in FIG. 4. The vent screw 14 has a flat portion 18 on one side of its threaded shank, thereby forming a sealable air passage. As more fully described in conjunction with the description of FIG. 4, the closure 12 is used to connect the cap 10 to a gas can.

An indicator apparatus is attached in a visually apparent manner to the upper, normally exposed surface of the closure 12. The indicator apparatus utilizes a movable indicator 20, which can be shifted to either of two positions, as identified by imprinted regions 22, 24 on the closure. The indicated one of the imprinted regions 22, 24 correspondingly communicates whether the particular gas tank contains a two-stroke or a four-stroke fuel mixture.

A measuring apparatus, as shown generally be reference number 30, is connected to the lower face of the closure 12. A cylinder 32 is attached to the closure 12. The cylinder 32 is open at its lower end, and is used to measure the exact quantity of oil to be added to prepare a two-stroke fuel mixture.

Figure 2:
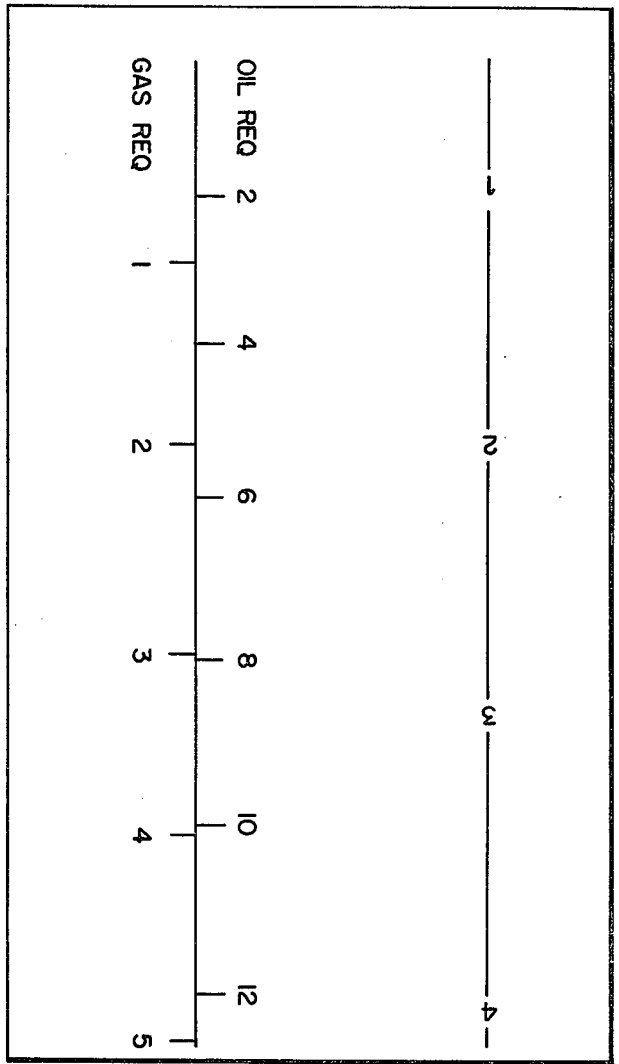
FIG. 2 is an elevational view of the scales applied to the surface of the cylinder of the gas cap of FIG. 1.

Referring then to FIG. 2, the surface of the cylinder 32 is shown projected onto a planar surface. A quantity-converting dual-scale number line 34 is affixed to one side of the cylinder 32, and provides a graphic indication of the relative quantities of gas and oil which must be added to fill a tank to any desired level with an additional quantity of mixture. A "Gas Required", or fuel scale, of the dual-scale number line 34 is calibrated to correspond to a tank of known volume and internal contour, in which case the distance from the gasket surface (see FIG. 4) to a particular depth in the tank corresponds to a predictible volume. Thus, the "Gas Required" scale can be calibrated to provide a direct, "dipstick-type", reading of the quantity of gasoline required to fill the tank to any desired fuel mixture level. The "Oil Required" scale of the dual-scale number line 34, in turn, provides a precise, immediate, indication of the corresponding quantity of oil which must be added to prepare the particular quantity of fuel to fill the tank to any desired fuel mixture level, while also assuring the correct gas-to-oil ratio for the fuel mixture necessary for the proper operation of the designated engine.

If it is desirable to completely fill or "top-off" the tank with an additional quantity of fuel mixture, then the required quantities of gas and oil required to fill the tank may be read directly from the dual-scale number line 34 at the existing fuel mixture level in the tank. However, if it is desirable to fill the tank to some level below its capacity, the required quantities of gas an oil may be determined by substracting the quantities of gas an oil indicated on the dual scale at the desired level of fuel mixture from the quantities of gas and oil shown on the dual scale at the existing level of the fuel mixture in the tank.

On the other side of the cylinder 32, an oil measurement scale 36 is provided to indicate the actual internal volume of the the cylinder 32 corresponding to the indicated quantity. Thus, it is easy to ascertain the quantity of gas required to fill a tank to any desired level, to determine the required quantity of oil, and also to measure that oil precisely in the cylinder 32. A particular advantage of the measuring appratus 30 is that it is normally stored within the protected environment of the tank itself, so that it remains free of foreign matter and contamination during use. When needed, it can be removed from the tank. Since the measuring apparatus 30 forms an integral part of the gas cap 10, it is virtually impossible to lose, in marked contrast to a separate measuring device.

Figure 3:
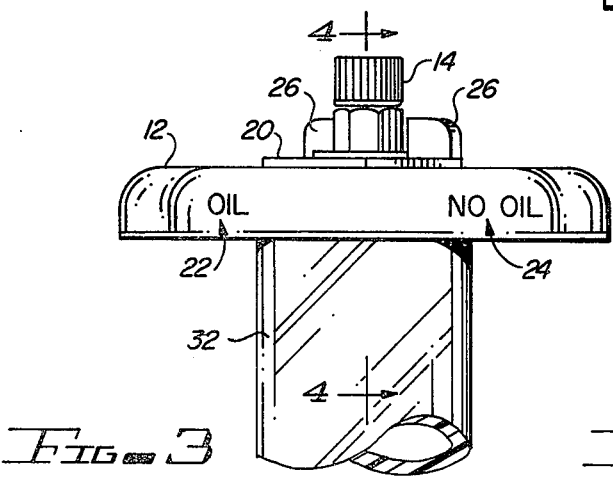
FIG. 3 is an elevational view the upper portion of the gas cap of FIG. 1.

In FIG. 3, an enlarged elevational view of the closure 12 is shown. The indicator 20 is provided with handles 26 to facilitate changing its position. The vent screw 14 is shown bottomed against the closure 12, thereby sealing the air vent.

Figure 4:
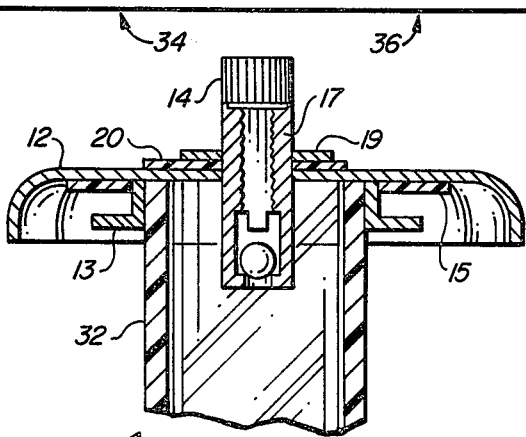
FIG. 4 is a sectional view taken along line 4—4 of FIG. 3.

FIG. 4 is a sectional view taken along line 4—4 of FIG. 3. The closure 12 includes locking tangs 13, which engage the opening of a gas can, in a conventional manner. A gasket 15 is positioned to contact the opening of the gas can, and provide a seal with the gas cap 10. The lower surface of the gasket 15 also defines the reference from which the fuel-level-measuring, dual-scale number line 34 is calibrated. A washer 19 is coupled to the sleeve 17, and traps the indicator 20 against the closure 12.

In use on a gas tank, the cap 10 does not interfere with the normal operation of the tank. The vent screw 14 can be backed off to provide an air vent to allow fuel to be withdrawn from the tank. When the tank is to be filled with fuel for a four-stroke engine, the cap 10 is simply removed, the fuel added, the cap replaced and the indicator 20 set to the "NO OIL" position. When the tank is to be filled to a desired level with fuel for a two-stroke engine, the cap 10 is removed, and the quantity of fuel currently in the tank is determined by examining the dipstick scale 34. A corresponding requisite quantity of oil to fill the tank to the desired level is read directly from the dipstick scale 34. With the vent screw 14 threaded into a closed position, the requisite quantity of oil is measured into the cylinder 32. The oil-measurement scale 36 permits a precise measurement of the oil, which is then poured into the tank. The required amount of gasoline is then added to the the tank to form a suitable fuel mixture. The indicator 20 is appropriately positioned, and the cap 10 is again installed.

While the invention has been particularly described and shown in reference to the preferred embodiments thereof, it will be understood by those skilled in the art that various changes in form and detail, and omissions, may be made therein without departing from the spirit and scope of the invention.

I claim:

1. An improved sealing-cap for a fuel tank comprising, in combination:
    closure means having a removable closure for engaging said tank;
    measuring means having a graduate coupled to the tank-side of said closure for providing an oil-measuring receptacle;
    dipstick means in communication with said graduate for providing a measure of the quantity of gas required to fill said tank to a desired fuel mixture level;
    conversion means adjoining said dipstick means for providing a measure of the quantity of oil required to fill said tank to a desired fuel mixture level;
    indicator means coupled to said cap for indicating whether said tank contains an oil mixture; and
    vent means coupled to said cap for permitting the interior of said tank to be selectively vented.

2. An improved cap in accord with claim 1, wherein said indicator means comprises a visual indicator coupled to said cap for indicating whether said fuel tank contains an oil mixture.

3. A cap in accord with claim 1, wherein said dipstick means in communication with said graduate comprises a visual indicia of the quantity of gas required to fill said tank to a desired fuel mixture level so that when said cap is removed from said tank said required quantity of gas can be read from said dipstick means.

4. A cap in accord with claim 3, wherein said conversion means adjoining said dipstick means comprises a visual indicia of the quantity of oil required to fill said tank to a desired fuel mixture level with a gas and oil mixture for a two stroke engine.

5. A cap in accord with claim 1, wherein said measuring means further includes said graduate having scale means in communication with said graduate for permitting a visual measurement of the oil to be added to a given quantity of gas in order to fill said tank to a desired fuel mixture level.

6. A cap in accord with claim 2, wherein said indicator means further comprises:
said indicator means having a rotatable indicator coupled to said cap, said indicator having a triangular-shaped pointer and handles to facilitate changing its position; and
said cap having indicia thereon so that the position of said indicator discloses whether said tank contains an oil mixture.

7. A cap in accord with claim 1, wherein said vent means comprises a vent sleeve coupled to said cap having internal threads for operably engaging a vent screw and for providing an air passage, and a vent screw having a flat portion on one side of its threaded shank thereby providing a sealable air passage.

* * * * *